US011473665B2

(12) United States Patent
Arnault et al.

(10) Patent No.: US 11,473,665 B2
(45) Date of Patent: Oct. 18, 2022

(54) PULLEY DEVICE

(71) Applicant: Aktiebolaget SKF

(72) Inventors: Benoit Arnault, Saint-Cyr-sur-Loire (FR); Nicolas Tronquoy, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 387 days.

(21) Appl. No.: 16/709,149

(22) Filed: Dec. 10, 2019

(65) Prior Publication Data

US 2020/0191251 A1    Jun. 18, 2020

(30) Foreign Application Priority Data

Dec. 18, 2018  (FR) ...................................... 1873192

(51) Int. Cl.
   *F16H 55/36*  (2006.01)
   *F16C 19/08*  (2006.01)
   *F16H 7/20*  (2006.01)

(52) U.S. Cl.
   CPC ............. *F16H 55/36* (2013.01); *F16C 19/08* (2013.01); *F16H 7/20* (2013.01)

(58) Field of Classification Search
   CPC ...... F16C 13/006; F16C 19/06; F16C 35/073; F16C 2361/63; F16C 33/723; F16H 55/36; F16H 2007/0865; F16H 7/20; F16H 55/44
   USPC .......................................... 474/199, 166, 70
   See application file for complete search history.

(56) References Cited

U.S. PATENT DOCUMENTS

| | | | | |
|---|---|---|---|---|
| 2,198,831 A * | 4/1940 | Moyer | ................... | D06M 15/07 474/190 |
| 2,349,281 A * | 5/1944 | Kendall | ..................... | F16H 7/20 384/547 |
| 3,770,992 A * | 11/1973 | Veglia | .................... | F16C 43/045 384/489 |
| 3,789,683 A * | 2/1974 | Frost | ....................... | F16H 55/44 474/181 |
| 3,926,485 A * | 12/1975 | Frost | ..................... | F16C 35/077 384/510 |
| 3,998,505 A * | 12/1976 | Frost | ..................... | F16C 27/066 384/510 |
| 4,025,132 A * | 5/1977 | Watanabe | ............. | F16C 33/805 384/130 |
| 4,295,686 A * | 10/1981 | Black | ........................ | B60C 7/10 301/105.1 |
| 4,373,759 A * | 2/1983 | Greener | ................. | F16C 35/073 384/480 |
| 4,443,210 A * | 4/1984 | Olschewski | ............ | F16H 55/44 474/902 |
| 4,518,372 A * | 5/1985 | Dye | ...................... | F16C 13/006 474/94 |
| 4,602,875 A * | 7/1986 | Doerr | .................... | F16C 13/006 384/488 |
| 4,610,646 A * | 9/1986 | Walter | ...................... | F16H 7/20 474/197 |
| 4,955,732 A * | 9/1990 | Behrens | ................ | F16C 33/588 384/560 |
| 4,998,346 A * | 3/1991 | Behrens | ................ | F16C 33/588 29/898.067 |
| 5,242,229 A * | 9/1993 | McLarty | ............. | F16C 33/7879 384/477 |
| 5,275,472 A * | 1/1994 | Hicks | ...................... | F16D 63/00 301/105.1 |
| 5,517,957 A * | 5/1996 | Wagner | ................. | F16D 41/066 123/192.1 |
| 5,630,769 A * | 5/1997 | Schmidt | ................ | F16C 13/006 474/902 |
| 5,908,094 A * | 6/1999 | Le-Calve | ................ | F16D 41/07 192/109 R |
| 6,010,420 A * | 1/2000 | Niki | ...................... | F16C 19/166 474/199 |
| 6,237,736 B1 * | 5/2001 | Ouchi | .................... | F16D 41/067 474/70 |
| 6,241,257 B1 * | 6/2001 | Hauck | ................... | F16C 13/006 384/489 |
| 6,500,085 B2 * | 12/2002 | Kawachi | ................ | F16H 55/36 474/166 |
| 7,011,593 B2 * | 3/2006 | Schenk | ...................... | F16H 7/20 384/477 |
| 7,695,385 B2 * | 4/2010 | Barraud | .................. | F16C 41/04 474/199 |
| 8,172,056 B2 * | 5/2012 | Barraud | ................ | F16D 41/069 192/113.32 |
| 8,651,988 B2 * | 2/2014 | Kapfer | .................. | F16C 13/006 474/135 |
| 10,228,051 B2 * | 3/2019 | Basile | ..................... | F16H 55/36 |
| 2002/0183147 A1 * | 12/2002 | Fujiwara | ............... | F16D 41/067 474/70 |
| 2003/0008743 A1 * | 1/2003 | Cadarette | ................ | F16H 55/36 474/166 |
| 2004/0206594 A1 * | 10/2004 | Miller | ................... | F02N 15/023 74/6 |

(Continued)

FOREIGN PATENT DOCUMENTS

DE        19850157 A1      5/1999
DE    102006019538 A1    10/2007

(Continued)

*Primary Examiner* — Henry Y Liu

(74) *Attorney, Agent, or Firm* — Garcia-Zamor Intellectual Property Law; Bryan Peckjian; Ruy Garcia-Zamor

(57) ABSTRACT

A pulley device for a transmission element having a pulley, a bearing, and at least one sleeve mounted freely in the bore of the inner ring of the bearing. The pulley device includes at least one annular protection shield, the shield retained axially in a first element from the pulley and coming into immediate proximity with the other element, the other element having at least one shoulder projecting radially ensuring that it is axially retained with the shield.

7 Claims, 5 Drawing Sheets

(56) References Cited

U.S. PATENT DOCUMENTS

| | | | |
|---|---|---|---|
| 2004/0220006 A1* | 11/2004 | Denis | F16H 57/025 474/199 |
| 2004/0235599 A1* | 11/2004 | Ozorak | F16C 35/02 474/170 |
| 2005/0009657 A1* | 1/2005 | Miyata | F16H 7/18 474/174 |
| 2006/0142102 A1* | 6/2006 | Radocaj | F16H 55/50 474/170 |
| 2007/0072714 A1* | 3/2007 | Filip | F16H 7/20 474/70 |
| 2009/0098967 A1* | 4/2009 | Eidloth | F16C 33/6607 474/199 |
| 2009/0191999 A1* | 7/2009 | Joseph | F16H 55/36 384/485 |
| 2009/0226124 A1* | 9/2009 | Nakagawa | F16J 15/164 384/478 |
| 2009/0298630 A1* | 12/2009 | Mineno | F16C 35/073 474/199 |
| 2011/0039648 A1* | 2/2011 | Lannutti | F16H 7/20 474/166 |
| 2012/0142470 A1* | 6/2012 | Varnnoux | F16C 19/163 474/199 |
| 2015/0141185 A1* | 5/2015 | Albrecht | F16H 7/20 474/199 |
| 2015/0267790 A1* | 9/2015 | Hedman | F16H 7/20 474/199 |
| 2015/0267791 A1* | 9/2015 | Hedman | F16C 13/006 474/199 |
| 2015/0292603 A1* | 10/2015 | Cherioux | F16C 35/073 474/166 |
| 2016/0076594 A1* | 3/2016 | Moratz | F16C 33/7846 384/484 |
| 2016/0116050 A1* | 4/2016 | Arnault | F16C 19/166 474/199 |
| 2017/0146066 A1* | 5/2017 | Little | F16C 23/084 |

FOREIGN PATENT DOCUMENTS

| | | |
|---|---|---|
| DE | 102007039136 A1 | 2/2009 |
| EP | 1061278 A1 | 12/2000 |
| EP | 3135957 A1 | 3/2017 |
| FR | 2889278 A1 | 2/2007 |
| FR | 3029586 A1 | 6/2016 |
| WO | 0221005 A1 | 3/2002 |

\* cited by examiner

[Fig 1]
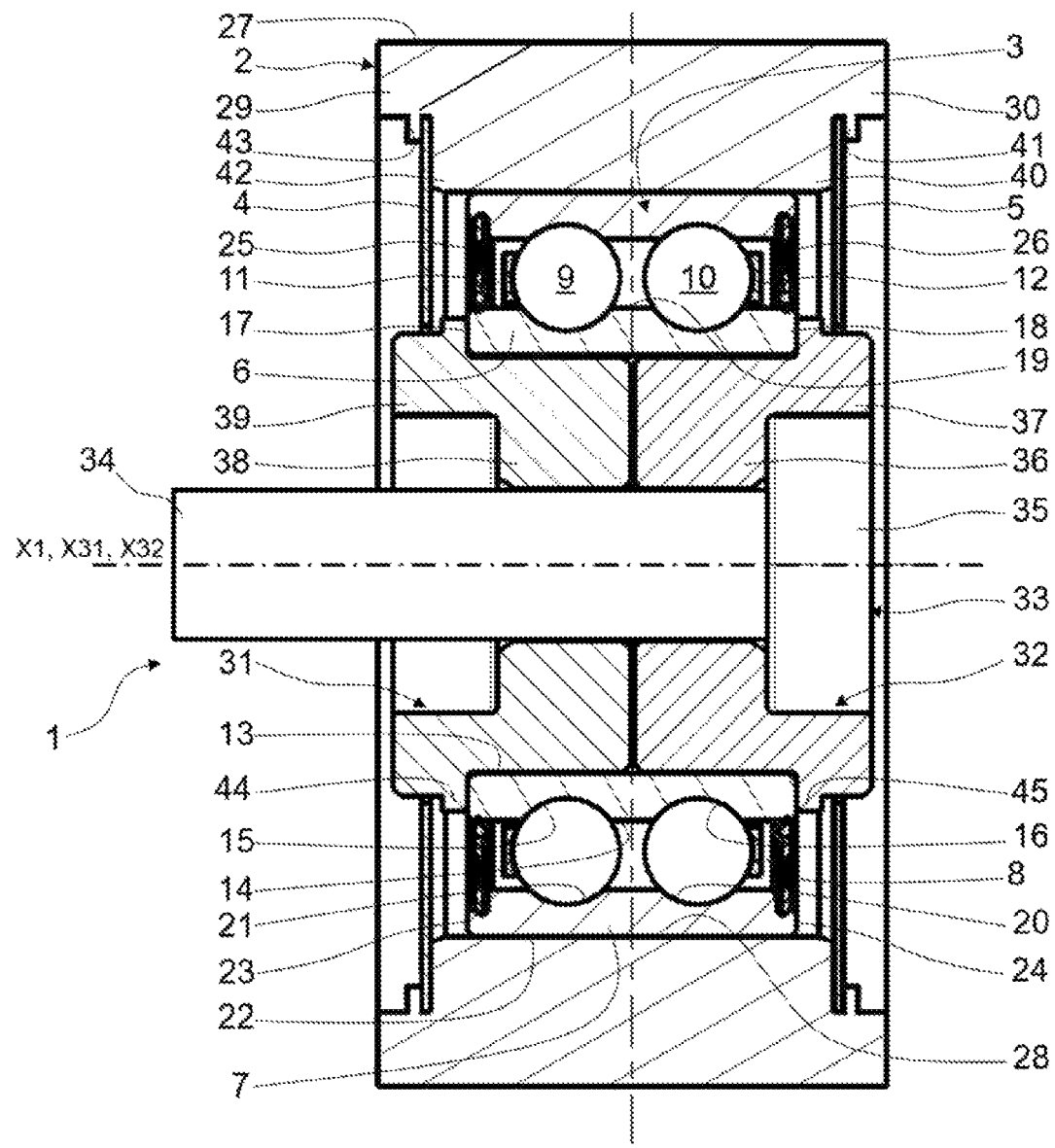

[Fig 2]
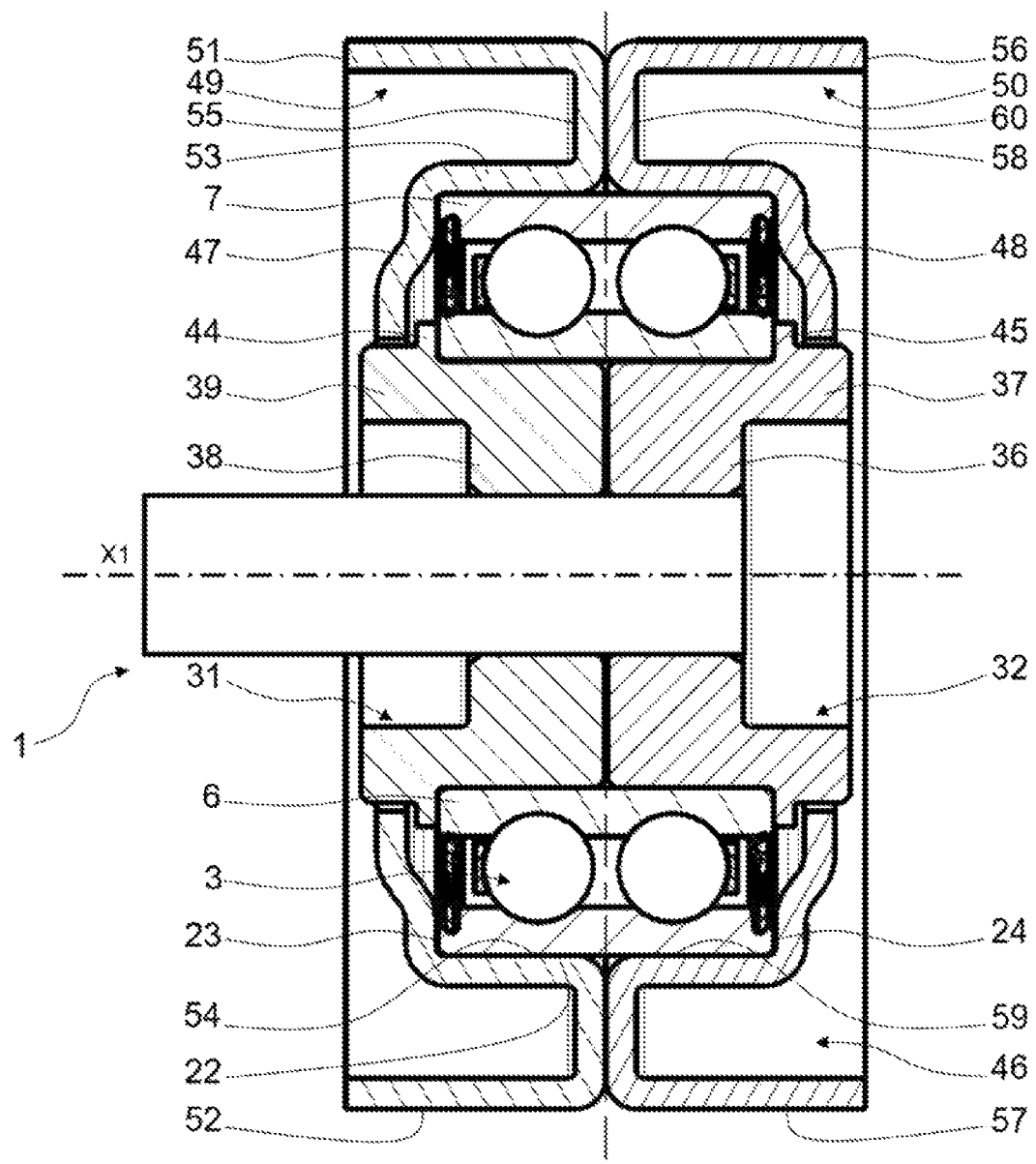

[Fig 3]
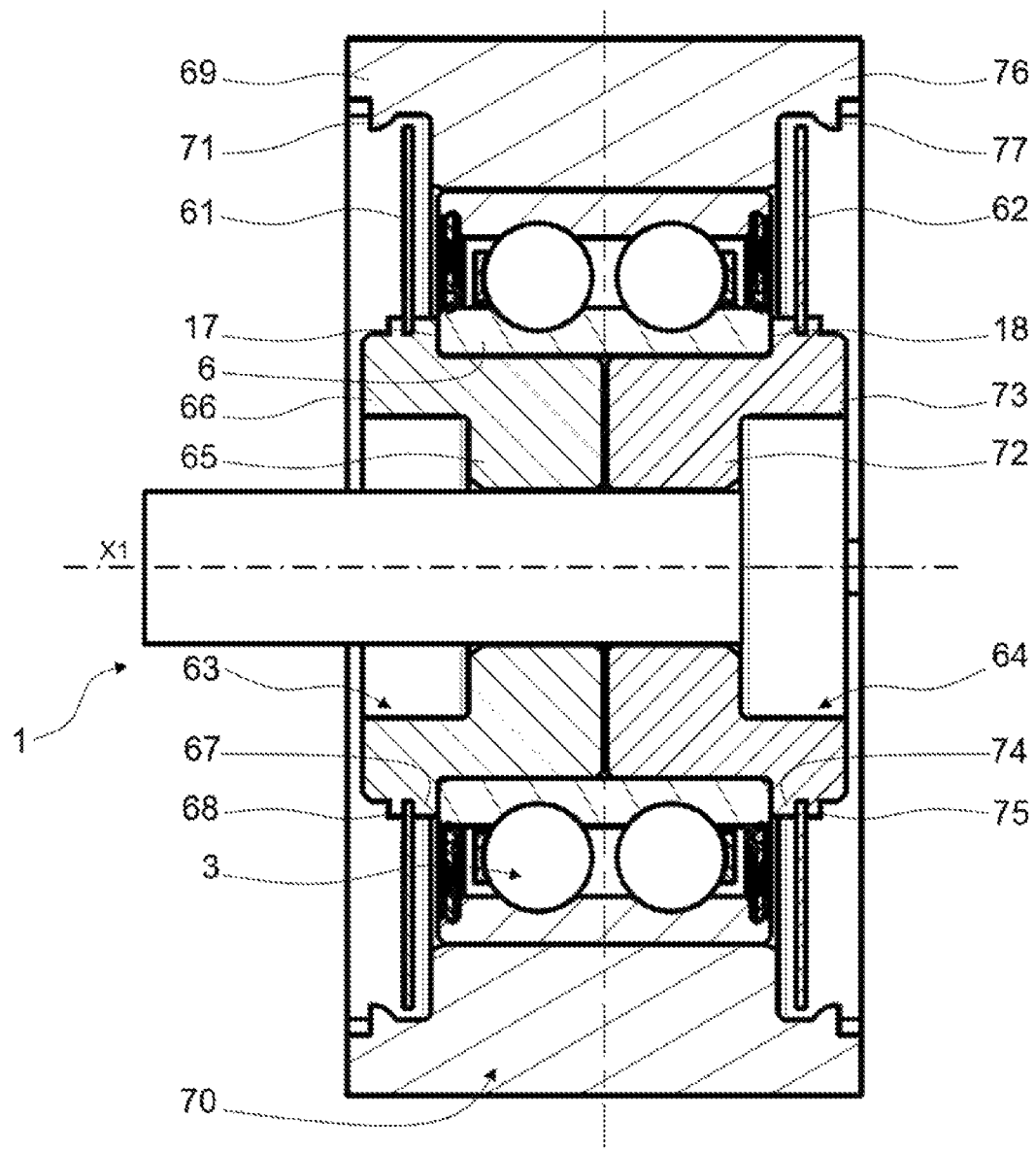

[Fig 4]
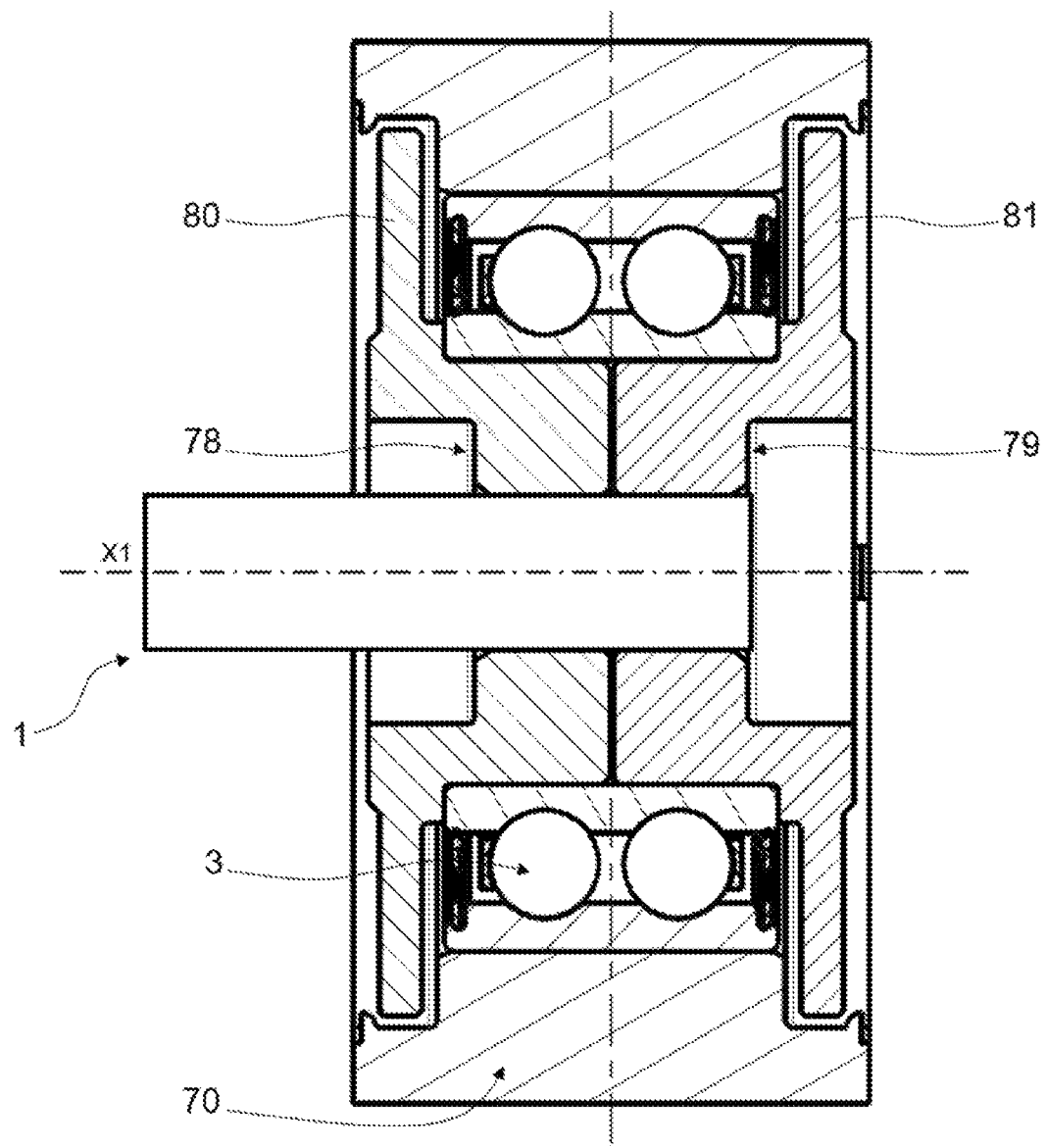

[Fig 5]
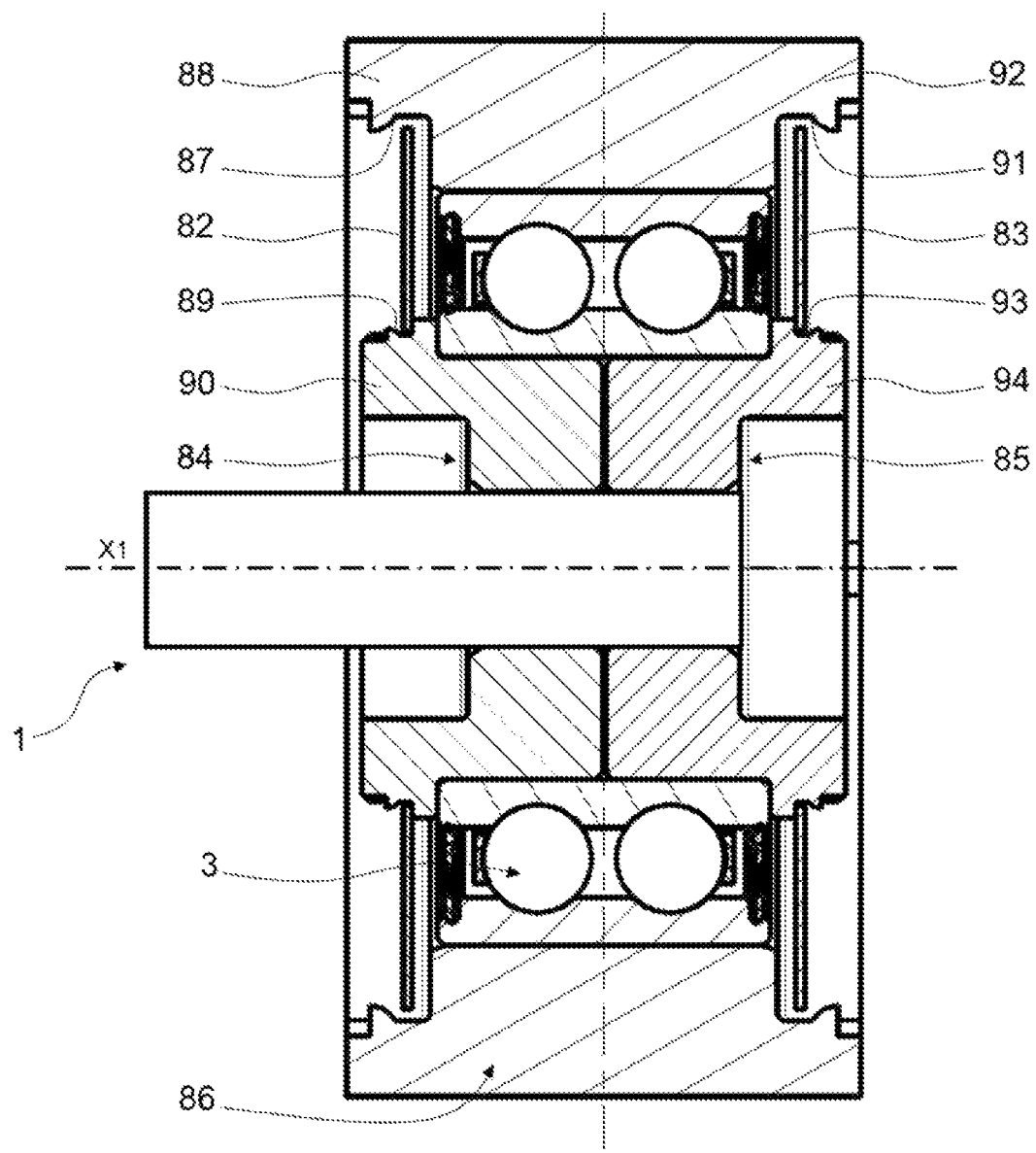

PULLEY DEVICE

TECHNICAL FIELD OF THE INVENTION

The present invention relates to a pulley device. The field of the invention is that of tension rollers for tensioning a chain or a belt for transmission of movements, rollers, belt tighteners, loose pulleys, and any other rotation transmission support means.

BACKGROUND OF THE INVENTION

In a known manner, such a pulley device can comprise a bearing, a pulley, and a fastening screw. The bearing generally comprises a fixed inner ring with a bore through which the screw passes, a rotating outer ring surmounted by the pulley, and at least one row of rolling elements inserted between the rings. The screw comprises a head and a threaded shaft. The screw passes through the inner ring of the bearing such that the threaded shaft thereof enters a tapped hole provided in a support, for example an engine block.

It is recommended to avoid a mechanical contact between the rotating elements of the bearing and the support which can particularly be placed within the engine compartment of a motor vehicle and subjected to frequent vibrations. For this purpose, it is known to use a spacer in order to axially space apart the bearing from the support. For example, it is known from DE-A-19850157 to provide a sleeve which is over-moulded or fitted into the inner ring of the bearing and provided with an end forming a spacer with the support. In the earlier publication FR-A1-3029586, the pulley device comprises two sleeves mounted head-to-tail in a rigidly connected manner in a bore of the inner ring. However, the manufacturing tolerances for a sleeve and for the bore of the inner ring must be extremely precise in order to ensure an effective rigid connection in order to prevent any relative movement, whether during the transportation of the pulley toward the mounting location thereof or during the operation thereof.

Such a pulley device is also often equipped with seals or additional shields for protection, helping to protect the device against pollution or splashes coming from the outside environment. Particles or other elements of pollution can however penetrate, which can accumulate over time in immediate proximity to the sealing means for the bearing. Since the sealing means can become worn, the risk of the pollution penetrating into the bearing chamber increases with the duration of use of the pulley device. This internal pollution can result in an accelerated deterioration of the components internal to the bearing, in particular the contact surfaces between the rolling elements and the rings. Therefore, this can lead to a decrease in the quality of the rotating mechanical linkage provided by the pulley device, and a reduced life of the internal components thereof. The risk of breakage, particularly in operation mode, is also greater.

SUMMARY OF THE INVENTION

The present invention aims to overcome these aforementioned disadvantages.

More specifically, the present invention aims to provide a pulley device that is resilient in high-pollution conditions, particularly economical, easily and securely mounted, forming a non-detachable subassembly, and with a reduced axial and radial spatial requirement.

The invention relates to a pulley device for a transmission element comprising a pulley with an outer surface intended to engage the transmission element, a bearing, and at least one sleeve.

The bearing is provided with a rotating outer ring, the pulley being mounted on an outer surface of the outer ring, with a fixed inner ring, the sleeve being housed in a bore of the inner ring, the rings being coaxial and forming a radial space therebetween, and with at least one row of rolling elements that is arranged in the radial space.

According to the invention, the sleeve is mounted freely in the bore of the inner ring. The pulley device furthermore comprises at least one annular protection shield. The shield has a mainly radial body extending between a first end retained axially in a first element from the pulley and the sleeve, and a second end coming into immediate proximity with the other element, the other element having at least one shoulder projecting radially ensuring that it is axially retained with the second end.

Thanks to the invention, an annular protection shield is mounted such as to be rigidly connected to the pulley device with a satisfactory concentricity, avoiding the design of complex pieces.

The pulley device, and more particularly the radial space between the coaxial rings of the bearing, is protected from the intrusion of pollution. The life and the quality of the mechanical linkage provided by the bearing are improved thereby.

Moreover, the shield forms an axial stop for the sleeve such as to ensure retention in the bore of the inner ring. The sleeve is mounted freely in the bore of the inner ring, i.e. with a radial clearance between an outer surface of the sleeve and an inner surface of the bore, but remains axially rigidly connected to the inner ring and therefore to the pulley device. The necessary tolerances thus require less precision giving a saving in time and a reduction in the manufacturing cost.

According to other advantageous but non-essential features of the invention, such a pulley device can also include the following features, taken separately or in any technically permissible combination:

The first element is the pulley, and the other element is the sleeve.

The first element is the sleeve, and the other element is the pulley.

The pulley device comprises two sleeves arranged on either side axially in the bore of the inner ring.

The first end of the shield is rigidly connected to the first element.

The shield is formed as a single piece with the first element.

The pulley is supplied with at least one pulley element having a shape of a C in axial cross-section and having an inner portion mounted on the outer surface of the outer ring of the bearing, an outer portion with an outer surface intended to engage the transmission element, and an intermediate portion extending mainly radially between axial ends of the inner and outer portions along a first axial side, and a shield extending laterally and mainly radially from an axial end of the inner portion axially away from the intermediate portion, the pulley element being formed as a single piece.

The first end of the shield is axially retained by a radially projecting shoulder with which the first element is supplied.

The first end of the shield is retained such as to be rigidly connected to the first element from the pulley and the sleeve by crimping at several circumferential locations.

The other element comprises a hollow zone in which the free end of the shield is housed.

The shoulder is annular.

The shoulder extends over a portion of the circumference of the other element.

The shoulder is formed by a collar with which the other element is supplied.

The shoulder is formed by a deformation of a lateral edge of the other element.

A cage maintains the circumferential spacing of the rolling elements.

The rolling elements are balls.

The pulley device furthermore comprises rear and front sealing means closing the radial space on each axial side.

The pulley is made from metal, for example from steel.

The pulley is made from plastic, for example from polyamide.

The pulley is formed by overmoulding plastic on the outer ring of the bearing.

The shield is made from metal, for example from steel.

The shield is made from plastic or synthetic material, for example from polyamide.

The sleeve is made from metal, for example from steel.

The sleeve is made from plastic or synthetic material, for example from polyamide.

BRIEF DESCRIPTION OF THE FIGURES

The invention will be better understood upon reading the following description given solely by way of nonlimiting example.

The description is given with reference to the appended drawings wherein:

FIG. 1 is an axial section view of a pulley device in accordance with a first embodiment of the invention;

FIG. 2 is an axial section view of a pulley device in accordance with a second embodiment of the invention;

FIG. 3 is an axial section view of a pulley device in accordance with a third embodiment of the invention;

FIG. 4 is an axial section view of a pulley device in accordance with a fourth embodiment of the invention; and FIG. 5 is an axial section view of a pulley device in accordance with a fifth embodiment of the invention.

DETAILED DESCRIPTION OF THE INVENTION

As can be seen in FIG. 1, a pulley device, for example for a tension roller, belt tightener, pinion or in gearing, is referenced as 1 in the entirety thereof. The pulley device 1 has a geometric axis X1, and comprises a pulley 2 suitable for engaging a transmission element (not represented) like a belt or a chain, a bearing 3, and two protection shields 4, 5.

The bearing 3 comprises a fixed inner ring 6, a rotating outer ring 7, the rings 6, 7 being coaxial around the axis X1 and forming a radial space 8 therebetween. The bearing 3 also comprises two rows of rolling elements 9 and 10, in this case produced as balls, placed between the rings, and cages 11 and 12 maintaining the circumferential spacing of the rolling elements 9 and 10, respectively.

The inner 6 and outer 7 rings are concentric. In the illustrated exemplary embodiment, the rings are solid, i.e. obtained by machining or grinding with removal of material from metal tubes, bars, forged pieces or rolled blanks. In an alternative that is not illustrated, the rings can be non-concentric and have eccentric axes.

The inner ring 6 comprises a bore 13, and outer surface 14, a cylindrical portion of which is supplied with raceways 15, 16 having, in axial section, a toroid-shaped and concave internal profile suitable for the balls 9, 10, and two rear 17 and front 18 lateral surfaces.

The bore 13 of the inner ring 6 is suitable for receiving a screw 33, the body 34 of which extends axially beyond the rear lateral surface 17 of the fixed inner ring 6, the body comprising a threaded portion intended to be screwed into a corresponding tapped opening of a support (not represented) for the pulley device 1.

The outer ring 7 comprises a cylindrical bore 19 supplied with raceways 20, 21 having, in axial section, a toroid-shaped and concave internal profile suitable for the balls 9, 10, an outer cylindrical surface 22 on which the pulley 2 is mounted, and two rear 23 and front 24 lateral surfaces.

The bearing 3 advantageously comprises annular rear 25 and front 26 seals in order to close, on each axial side, the radial space 8 existing between the rings 6, 7 and inside which the rolling elements 9, 10 are housed.

The seals 25, 26 advantageously each comprise a first end fixed in a circumferential groove supplied at a bore 19 portion of the outer ring 7, and a second end formed by a lip in sliding contact against a portion of the outer surface 14 of the inner ring 6. The radial space 8 is thus closed in a sealed manner axially between the two seals 25, 26.

Alternatively, the bearing can comprise a different number of rolling element rows arranged between the outer and inner rings, for example a single row of rolling elements.

Alternatively, the bearing can comprise other types of rolling elements, for example tapered rollers or needles.

The pulley 2 comprises an outer cylindrical surface 27 intended to engage a transmission element like a belt or a chain, and an inner surface 28 mounted to be rigidly connected on the outer surface 22 of the outer ring 7. The pulley has a mainly tubular shape and is centred on the central axis X1. The frictional forces between the outer surface 27 and the transmission element allow the transmission of a torque.

According to another embodiment that is not represented, the transmission element can be a toothed belt, particularly of Poly-V type, or any other type without this limiting the present invention. The outer surface 27 is then supplied with elements such as ribs or notches such as to work with the shape of the belt.

The pulley 2 further comprises rear 29 and front 30 portions axially projecting with respect to the rear 23 and front 24 lateral surfaces, respectively, of the outer ring 7. The rear 29 and front 30 portions projecting axially are stepped.

The pulley 2 can advantageously be produced from plastic, and preferentially from polyamide, from PA6 or PA66 for example. The pulley 2 can advantageously be formed by overmoulding plastic on the outer ring 7 of the bearing 3. The result is excellent cohesion between these pieces. Alternatively, the pulley 2 can be produced from metal material, for example from steel, and tightly mounted on the outer cylindrical surface 22 of the outer ring 7. The pulley 2 can also have other shapes that are optimized according to the requirements of use.

The pulley device 1 also comprises rear 31 and front 32 sleeves mounted in the bore 13 of the fixed inner ring 6. The sleeves 31, 32 are made from plastic or synthetic material, for example from fibreglass reinforced polyamide. Alternatively, the sleeves can be made from metal, for example from steel.

The front sleeve 32 is arranged radially between the inner ring 6 and the screw 33 on the side of the head 35 thereof.

The front sleeve 32 is intended to supportingly receive the head 35 of the screw 33 when the latter is tightened in a corresponding internal thread of an engine support. The front sleeve 32 is centred on an axis X32 which is merged with the central axis X1 in the configuration of the pulley device 1. The front sleeve 32 comprises an axial cylindrical body 36 which is placed radially between the inner ring 6 and the body 34 of the screw 33. The cylindrical body 36 is freely mounted in the bore 13 of the inner ring 6 such that a radial clearance exists between the two elements after mounting. The front sleeve 32 also comprises a radial skirt 37 which is placed axially between the front lateral surface 18 of the inner ring 6 and the head 35 of the screw 33. The skirt 37 extends axially beyond the front lateral surface 18 of the inner ring 6.

The rear sleeve 31 is intended to be arranged radially between the inner ring 6 and a support of the device 1. The rear sleeve 31 is intended to supportingly receive the inner ring 6 when the latter is tightened by the screw 33 against an engine support. The rear sleeve 31 is intended to form a rest for the device 1 on the support thereof. The rear sleeve 31 is centred on an axis X31 which is merged with the central axis X1 in the mounted configuration of the pulley device 1. The rear sleeve 31 comprises an axial cylindrical body 38 which is placed radially between the inner ring 6 and the body 34 of the screw 33. The cylindrical body 38 is mounted freely in the bore 13 of the inner ring 6 such that a radial clearance exists between the two elements after mounting. The rear sleeve 31 also comprises a radial skirt 39 which is placed axially between the rear lateral surface 17 of the inner ring 6 and a support. The skirt 39 extends axially beyond the rear lateral surface 17 of the inner ring 6 such as to form a space for the pulley device 1 in order to prevent any mechanical contact between the rotating elements of the device 1 and the support.

In the embodiment illustrated in FIG. 1, the rear 31 and front 32 sleeves are identical and mounted axially in a symmetrical manner. Alternatively, the rear and front sleeves can be different, for example with a rear skirt having a different dimension to the front skirt depending on the requirement for axial spacing between the device 1 and the support thereof.

The pulley device 1 also comprises rear 4 and front 5 protection shields mounted on either side of the sealed radial space 8. More precisely, the rear shield 4 covers the rear seal 25, and the front shield 5 covers the front seal 26 such as to offer a preliminary protection against the outside pollution, in particular dusts and particles.

The front shield 5 has a mainly radial body extending between an outer first end mounted in the axially projecting front portion 30 of the pulley 2, and an inner second end coming into immediate proximity with an outer surface of the skirt 37 of the front sleeve 32.

The rear shield 4 has a mainly radial body extending between an outer first end mounted in the axially projecting rear portion 29 of the pulley 2, and a second inner end coming into immediate proximity with an outer surface of the skirt 39 of the rear sleeve 31.

The shields are advantageously formed by cutting a strip made from metal, for example from steel. Alternatively, the shields can be made from plastic or synthetic material, for example from polyamide.

According to the invention first embodiment illustrated in FIG. 1, the outer first ends of the rear 4 and front 5 shields are rigidly connected to the pulley 2. In the example illustrated in FIG. 1, the outer first end of the front shield 5 rests axially against a collar 40 of the stepped and projecting front portion 30 of the pulley 2, and is held axially in the other direction by crimping portions 41 obtained via plastic deformations of the lateral edge of the portion 30. Similarly, the outer first end of the rear shield 4 rests axially against a collar 42 of the stepped and projecting rear portion 29 of the pulley 2, and is held axially in the other direction by crimping portions 43 obtained by plastic deformations of the lateral edge of the portion 29. Advantageously, crimping portions are circumferentially regularly distributed over the axially projecting rear 29 and front 30 portions of the pulley 2. Alternatively, the shields can be rigidly connected to the axially projecting portions of the pulley by any suitable means of fixing, for example by sticking or overmoulding.

According to the invention first embodiment illustrated in FIG. 1, the inner second ends of the rear 4 and front 5 shields axially retain the rear 31 and front 32 sleeves, respectively. The rear sleeve 31 comprises a shoulder 44 projecting radially and axially housed between the inner second end of the rear shield 4 and the rear lateral surface 17 of the inner ring 6. The shoulder 44 is thus blocked axially by the rear shield 4 which itself is rigidly connected to the pulley 2. The rear sleeve 31 cannot thus be detached from the pulley device 1. Similarly, the front sleeve 32 comprises a shoulder 45 radially projecting and axially housed between the inner second end of the front shield 5 and the front lateral surface 18 of the inner ring 6. The shoulder 45 is thus blocked axially by the front shield 5 which itself is rigidly connected to the pulley 2. The front sleeve 32 cannot thus be detached from the pulley device 1.

A second embodiment is illustrated in FIG. 2. The pulley device 1 according to this alternative embodiment differs from the previous embodiment illustrated in FIG. 1 in that a pulley 46 and rear 47 and front 48 shields form a single-piece assembly.

More precisely, the pulley 46 comprises a rear pulley element 49, and a front pulley element 50.

The rear pulley element 49 comprises an outer annular portion 51 with an outer cylindrical surface 52 that can engage a transmission means, and a cylindrical bore (not referenced). The element 49 also comprises an inner annular portion 53 with a cylindrical bore 54 tightly mounted on the outer cylindrical surface 22 of the rotating outer ring 7 of the bearing 3, and an outer cylindrical surface (not referenced). The outer annular portion 51 is tubular and moreover has a greater diameter than the inner annular portion 53 which is also tubular, the outer annular portion 51 radially surrounding the inner annular portion 53. The outer annular portion 51 also has a greater axial dimension than the inner annular portion 53, the outer annular portion 51 axially projecting with respect to the inner annular portion 53 on the rear axial side of the device 1.

The rear pulley element 49 finally comprises an intermediate portion 55 for connecting the inner 53 and outer 51 annular portions. The intermediate portion 55 extends radially between the front axial ends of the inner 53 and outer 51 portions of the rear pulley element 49.

The rear pulley element 49 has a general shape of a C in axial cross-section, defining an annular opening open on the rear axial side of the device 1 in the direction of the support on which the device 1 is intended to be mounted.

The front pulley element 50 comprises an outer annular portion 56 with an outer cylindrical surface 57 that can engage a transmission means, and a cylindrical bore (not referenced). The element 50 also comprises an inner annular portion 58 with a cylindrical bore 59 tightly mounted on the outer cylindrical surface 22 of the rotating outer ring 7 of the bearing 3, and an outer cylindrical surface (not referenced).

The outer annular portion 56 is tubular and has a greater diameter than the inner annular portion 58 which is also tubular, the outer annular portion 56 radially surrounding the inner annular portion 58. The outer annular portion 56 also has a greater axial dimension than the inner annular portion 58, the outer annular portion 56 axially projecting with respect to the inner annular portion 58 on the front axial side of the device 1.

The front pulley element 50 finally comprises an intermediate portion 60 for connecting the inner 58 and outer 56 annular portions. The intermediate portion 60 extends radially between the rear axial ends of the inner 58 and outer 56 portions of the front pulley element 50.

The front pulley element 50 has a general shape of a C in axial cross-section, defining an annular opening open on the front axial side of the device 1 in the opposite direction to the support on which the device 1 is intended to be mounted.

The front 50 and rear 49 pulley elements are mounted on the rotating outer ring 7 of the bearing 3 such that the intermediate portions 60 and 55 thereof, respectively, radially bear against one another. The pulley elements 50, 49 are mounted axially in a symmetrical manner. The outer cylindrical surfaces 57, 52 of the outer annular portions 56, 51 of the front 50 and rear 49 pulley elements, respectively, together form a surface of engagement with a transmission element.

According to the invention embodiment illustrated in FIG. 2, the rear pulley element 49 is supplied with a rear shield 47.

The rear shield 47 extends mainly radially from an axial end of the inner portion 53 axially away from the intermediate portion 55 of the rear pulley element 49. The rear shield 47 axially bears against the rear lateral surface 23 of the outer ring 7 of the bearing 3. The rear shield 47 is supplied with a free end which comes into immediate proximity with an outer surface of the axially projecting rear skirt 39 of the rear sleeve 31 such as to form a radial narrow passage.

Similarly, and in the axially opposite direction to the rear shield 47, the front pulley element 50 is supplied with a front shield 48. The front shield 48 extends mainly radially from an axial end of the inner portion 58 axially away from the intermediate portion 60 of the front pulley element 50. The front shield 48 axially bears against the front lateral surface 24 of the outer ring 7 of the bearing 3. The front shield 48 is supplied with a free end which comes into immediate proximity with an outer surface of the axially projecting front skirt 37 of the front sleeve 32 such as to form a radial narrow passage.

Each of the rear 49 and front 50 pulley elements are advantageously made as a single piece, and are advantageously formed by cutting and stamping a metal sheet, for example made from steel.

The inner ends of the rear 47 and front 48 shields axially retain the rear 31 and front 32 sleeves, respectively. The rear sleeve 31 comprises a shoulder 44 radially projecting and axially housed between the inner second end of the rear shield 47 and the rear lateral surface 17 of the inner ring 6. The shoulder 44 is thus axially blocked by the rear shield 47 integrally formed with the rear pulley element 49. The rear sleeve 31 cannot thus be detached from the pulley device 1. Similarly, the front sleeve 32 comprises a shoulder 45 radially projecting and axially housed between the inner second end of the front shield 48 and the front lateral surface 18 of the inner ring 6. The shoulder 45 is thus axially blocked by the front shield 48 itself integrally formed with the front pulley element 50. The front sleeve 32 cannot thus be detached from the pulley device 1.

In an alternative that is not illustrated, only one of the front 50 or rear 49 pulley elements can be supplied with a lateral portion.

A third embodiment is illustrated in FIG. 3. It differs from the two embodiments described previously in that the rear 61 and front 62 shields are rigidly connected to the rear 63 and front 64 sleeves, respectively.

More precisely, the rear sleeve 63 comprises a cylindrical body 65 housed in the inner ring 6, and an outer radial skirt 66 axially projecting rearward with respect to the rear lateral surface 17 of the inner ring 6 of the bearing 3. The skirt 66 comprises a radially projecting collar 67. An inner end of the rear shield 61 is held to axially bear against the collar 67 via crimping portions 68 obtained by plastic deformations of the lateral edge of the skirt 66. The rear shield 61 is thus rigidly connected to the rear sleeve 63. The rigid connection can be achieved by any other suitable means, for example by sticking.

The rear shield 61 extends mainly radially from the inner end rigidly connected to the rear sleeve 63 toward an outer end coming into immediate proximity with an inner surface of a rearward axially projecting portion 69 of a pulley 70 such as to form a narrow passage. The portion 69 comprises at least one shoulder 71 extending radially inward such as to axially block the outer end of the rear shield 61.

The front sleeve 64 comprises a cylindrical body 72 housed in the inner ring 6, and an outer radial skirt 73 axially projecting frontward with respect to the front lateral surface 18 of the inner ring 6. The skirt 73 comprises a radially projecting collar 74. An inner second end of the front shield 62 is held to axially bear against the collar 74 by crimping portions 75 obtained by plastic deformations of the lateral edge of the skirt 73. The front shield 62 is thus rigidly connected to the front sleeve 64. The rigid connection can be achieved by any other suitable means, for example by sticking.

The front shield 62 extends mainly radially from the inner end rigidly connected to the front sleeve 64 toward an outer end coming into immediate proximity with an inner surface of a frontward axially projecting portion 76 of the pulley 70 such as to form a narrow passage. The portion 76 comprises at least one shoulder 77 extending radially inward such as to axially block the outer end of the front shield 62.

Advantageously, the shoulders 71, 77 of the pulley 70 holding the rear 61 and front 62 shields are formed by crimping but each leave an axial clearance for freedom for the outer ends of the shields.

Thanks to the invention, the rear 61 and front 62 shields are axially blocked in hollow zones formed at the axially projecting rear 69 and front 76 portions of the pulley 70. Since the shields 61, 62 each have the inner end thereof rigidly connected to a sleeve 63, 64, respectively, the two rear 63 and front 64 sleeves are thus axially held by the pulley 70 in the device 1.

A fourth embodiment is illustrated in FIG. 4. It differs from the embodiment illustrated in FIG. 4 in that a rear sleeve 78 and a rear shield 80 form a single-piece assembly, and in that a front sleeve 79 and a front shield 81 also form a single-piece assembly.

A fifth embodiment is illustrated in FIG. 5. It differs from the previous embodiments in that the rear 82 and front 83 shields are mounted in a manner where they are not rigidly connected to a pulley 86 and rear 84 and front 85 sleeves, but while being axially retained with these elements.

More precisely, the rear shield 82 extends between an outer first end and an inner second end. The outer end is housed in a hollow zone 87 formed at the inner surface of a rearward axially projecting portion 88 of the pulley 86. The hollow zone 87 is advantageously formed between a collar of the portion 88 and crimping portions formed by plastic deformations of a rear lateral edge of the portion 88. The second inner end is housed in a hollow zone 89 formed at the outer surface of an axially projecting rear skirt 90 of the rear sleeve 84. The inner and outer ends of the rear shield 82 are axially blocked in the hollow zones 87, 89 but with an axial clearance providing a certain freedom. The rear sleeve 84 mounted freely in the inner ring 6 is thus held axially. The holding device does not require a high degree of precision in the mounting adjustments and tolerances.

Similarly, the front shield 83 extends between an outer first end and an inner second end. The outer end is housed in a hollow zone 91 formed at the inner surface of a frontward axially projecting portion 92 of the pulley 86. The hollow zone 91 is advantageously formed between a collar of the portion 92 and crimping portions formed by plastic deformations of a rear lateral edge of the portion 92. The inner second end is housed in a hollow zone 93 formed at the outer surface of an axially projecting front skirt 94 of the front sleeve 85. The inner and outer ends of the front shield 83 are axially blocked in the hollow zones 91, 93 but with an axial clearance providing a certain freedom. The front sleeve 85 freely mounted in the inner ring 6 is thus held axially.

Furthermore, the technical features of the various embodiments can be, entirely and only for some thereof, combined with one another. Thus, the pulley device can be adapted in terms of costs, performance and simplicity of implementation.

The invention claimed is:

1. Pulley device for a transmission element comprising:
   a pulley with an outer surface intended to engage the transmission element,
   a bearing provided with a rotating outer ring, the pulley being mounted on an outer surface of the outer ring, with a fixed inner ring, the rings being coaxial and forming a radial space therebetween, and with at least one row of rolling elements that is arranged in the radial space, and
   at least one sleeve housed in a bore of the inner ring, wherein
   the sleeve is mounted freely in the bore of the inner ring, wherein
   the pulley device further comprises at least one annular protection shield, the shield having a mainly radial body extending between a first end retained axially in a first element from the pulley, and a second end coming into immediate proximity with the sleeve, the sleeve having at least one shoulder projecting radially ensuring that the shield is axially retained with the second end, and wherein the shoulder, located axially between the inner ring and the protection shield, radially overlaps an end of the inner ring.

2. Pulley device according to claim 1, wherein the first end of the shield is rigidly connected to the first element.

3. Pulley device according to claim 1, wherein the shield is formed as a single piece with the first element.

4. Pulley device according to claim 3, wherein the pulley provides at least one pulley element having a shape of a C in axial cross-section and having an inner portion mounted on the outer surface of the outer ring of the bearing, an outer portion with an outer surface intended to engage the transmission element, and an intermediate portion extending mainly radially between axial ends of the inner and outer portions along a first axial side, and a shield extending laterally and mainly radially from an axial end of the inner portion axially away from the intermediate portion, the pulley element being formed as a single piece.

5. Pulley device according to claim 1, wherein the first end of the shield is retained such as to be rigidly connected to the first element from the pulley by crimping at several circumferential locations.

6. Pulley device according to claim 1, wherein the shoulder is formed by a collar with which the sleeve is supplied.

7. Pulley device according to claim 1, wherein the pulley device comprises two sleeves arranged on either side axially in the bore of the inner ring.

* * * * *